Sept. 13, 1932.    J. H. MILLER    1,877,008
ELECTRIC METER
Filed May 1, 1931
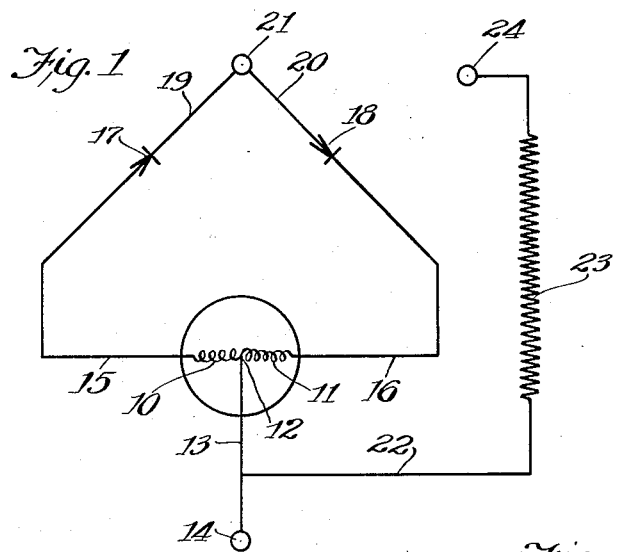
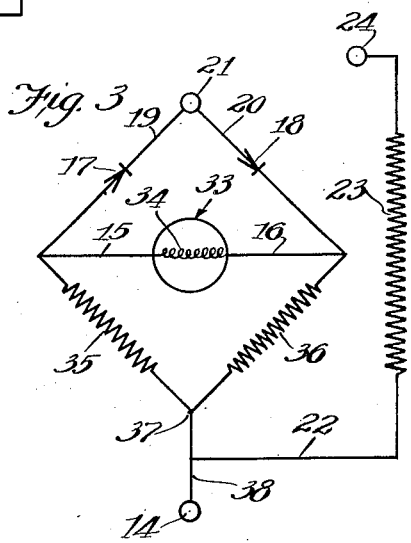
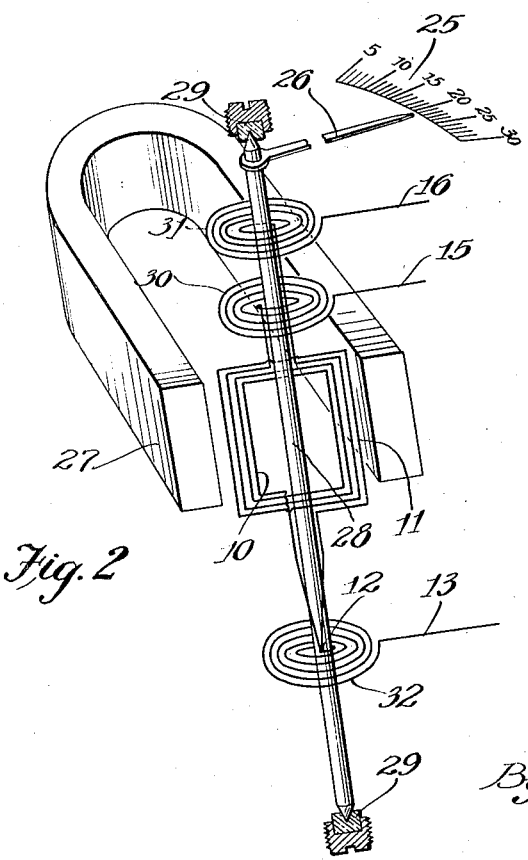
Inventor:
John H. Miller
By Williams, Bradbury,
McCaleb & Hinkle. Attys.

Patented Sept. 13, 1932

1,877,008

UNITED STATES PATENT OFFICE

JOHN H. MILLER, OF OAK PARK, ILLINOIS, ASSIGNOR, BY MESNE ASSIGNMENTS, TO JEWELL ELECTRICAL INSTRUMENT COMPANY, A CORPORATION OF NEW JERSEY

ELECTRIC METER

Application filed May 1, 1931. Serial No. 534,315.

The present invention relates to electric meters, and is particularly concerned with meters adapted to be used for alternating currents and voltages.

The bridge type rectifier meters of the prior art, are subject to numerous disadvantages, and one of the objects of the present invention is the provision of an improved meter in which such disadvantages are eliminated or minimized.

Rectifier discs are quite efficient as current rectifiers, but they have a considerable resistance which is added to the circuit. This resistance is of the order of 50 to 100 ohms in the small-sized discs ordinarily used for instrument work, and furthermore, the resistance is not constant. The resistance varies rather definitely with temperature, and the variation with temperature is increased according to the number of discs employed in the instrument. In a voltmeter, this variation with temperature can be compensated for by calibrating the scale accordingly, and in the case of high voltage instruments, can be made such a small factor that it is negligible on account of the high value of the series resistance.

The milliammeters of this type of the prior art, therefore have the disadvantage that the discs introduce high resistance into the circuit, and this is liable to unbalance the circuit in which they might be used. The fact that the rectifier resistance is not constant exaggerates this effect.

One of the objects of the present invention is the provision of an improved meter adapted to be used for alternating currents and voltages, in which the results secured are more accurate and uniform due to the lesser number of rectifiers required.

Another object is the provision of a low resistance meter of the class described, due to the elimination of the resistance of half of the rectifiers which would be used in a bridge type rectifier.

Another object is the provision of a rectifier meter which is sturdy, sensitive, accurate and more economical than the rectifier meters of the prior art.

Other objects and advantages of the invention will be apparent from the following description and from the accompanying drawing, in which similar characters of reference indicate similar parts throughout the several views.

Referring to the single sheet of drawing;

Fig. 1 is a schematic wiring diagram of a meter constructed according to the present invention;

Fig. 2 is a perspective view of the instrument part of the meter;

Fig. 3 is a schematic diagram of a modified form which may be used with any type of direct current meter.

The preferred form of instrument comprises a movable element which is provided with two windings for the moving coil, or what may be termed a split coil. The windings 10 and 11 have their ends joined at the point 12 to a common conductor 13 leading to the milliammeter terminal 14. The opposite ends of the windings 10 and 11 are connected by conductors 15 and 16, respectively, to rectifiers 17 and 18. The rectifiers 17 and 18 are connected by conductors 19 and 20 to a common terminal 21. The rectifiers 17 and 18 are oppositely connected in the circuits leading from the terminal 21, that is, the rectifier 17 permits the passage of current in a direction toward the terminal 21, and the rectifier 18 permits the passage of current in a direction from the terminal 21.

When an alternating current voltage is impressed on the terminals 21 and 14, one-half the wave will pass through the conductor 20, rectifier 18, conductor 16, coil 11 and conductor 13, to the terminal 14 in a predetermined direction, and the other half of the wave will pass in the opposite direction through the other circuit between terminals 14 and 21, which may be traced as follows: 14, 13, 10, 15, 17, 19, 21.

It will thus be observed that both halves of the wave will be utilized, but the impulses of current will pass through windings 10 and 11 in the opposite direction with respect to the common juncture 12. Therefore, the windings 10 and 11 should be wound in opposite directions so that both impulses of current from the respective half waves, will produce a flux acting in the same direction.

The instrument may be made a combined milliammeter and voltmeter by providing a conductor 22 connected to conductor 13, and connected to a multiplying resistance 23, which is in turn connected to the voltmeter terminal 24. The terminals 21 and 24 may thus serve as voltmeter terminals, while the terminals 21 and 14 may serve as milliammeter terminals.

Referring to Fig. 2, this is a diagrammatic illustration of the instrument employed, in which 25 is a scale calibrated in terms of amperes, volts or any other unit depending on the use of the instrument, and 26 is the usual pointer. The instrument is preferably a direct current instrument of the type employing a permanent magnet 27 and a moving coil mounted on a spindle 28, which is mounted for rotation on the jewels 29.

The parts of the moving coil are split at 12 into two windings 10 and 11, which are wound in opposite directions and suitably insulated from the spindle 28, and the conductors 15 and 16 which lead to the coils 10 and 11, are connected thereto through the spiral springs 30 and 31, respectively. The common juncture 12 of the windings is connected to conductor 13 through the spiral spring 32.

It will thus be observed that the instrument shown in Fig. 2 is peculiarly adapted to be utilized in the circuit of Fig. 1, and the particular instrument shown is adapted to utilize both halves of a wave of alternating current without the necessity for the use of more than two rectifiers.

The rectifiers which are employed, preferably consist of metallic members, such as a copper or iron plate having a coating of a compound, such as an oxide of the metal formed directly thereon, but other forms of rectifiers, such as asymmetric crystals may also be employed.

Referring to Fig. 3, this is a modification in which the instrument indicated by the circle 33 may consist of a direct current instrument having the standard movement with a single moving coil 34. In this case, the conductors 15 and 16 are connected respectively to the balancing resistances 35 and 36, which have their juncture 37 connected by a conductor 38 to terminal 14. The resistances 35 and 36 should preferably be very accurately balanced, and should preferably consist of resistances having a temperature co-efficient of change of resistance adapted to compensate for the varying resistance of the rectifiers 17 and 18. That is, if the rectifiers 17 and 18 have a negative co-efficient of change of resistance with temperature, then the resistances 35 and 36 should have a positive co-efficient of resistance change with changes in temperature.

The advantage of the modification of Fig. 3 is that a standard D'Arsonval instrument may be employed, whereas the meter of Fig. 1 requires two windings for the moving coil.

It will thus be observed that on account of the elimination of half of the rectifiers of the prior art, the resistance of the present meter assembly may be reduced by half, and furthermore, the variable resistance effect is also reduced by half. The present instrument will also give a better response to high frequency currents, because of the fact that there is no shunting of the instrument coils by the disc capacity, or at least there is no shunting to the extent which takes place in the bridge type of rectifier. The sensitivity of a high grade D'Arsonval instrument is ample for the purposes of a meter of this type, so that the fact that only half of the moving coil is utilized at any instant does not detract from the advantages of the meter.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A rectifier meter comprising an instrument having a split coil, a common terminal for the parts of said coil, and rectifiers connected to the ends of said coil for current flow in opposite directions to feed current from an alternating current source to both parts of said coil.

2. A rectifier meter comprising an instrument having a split coil, a common terminal for the parts of said coil, rectifiers connected to the ends of said coil for current flow in opposite directions to feed current from an alternating current source to both parts of said coil, and a common terminal for said rectifiers.

3. An alternating current meter comprising a moving coil instrument having a pair of oppositely wound coils, and rectifiers connected to said coils to supply current in opposite directions from an alternating current source of supply.

4. A rectifier meter comprising an instrument having a pair of coils oppositely wound and having their ends connected to a common terminal, and a pair of copper oxide rectifier discs oppositely connected to the respective ends of said coils.

In witness whereof, I hereunto subscribe my name this 23rd day of April, 1931.

JOHN H. MILLER.